US011466666B2

United States Patent
Lin et al.

(10) Patent No.: US 11,466,666 B2
(45) Date of Patent: Oct. 11, 2022

(54) METHOD AND DEVICE FOR STITCHING WIND TURBINE BLADE IMAGES, AND STORAGE MEDIUM

(71) Applicant: SHANGHAI CLOBOTICS TECHNOLOGY CO., LTD., Shanghai (CN)

(72) Inventors: Wenfeng Lin, Shanghai (CN); Xun Liu, Shanghai (CN); Yan Ke, Shanghai (CN); George Christopher Yan, Shanghai (CN)

(73) Assignee: SHANGHAI CLOBOTICS TECHNOLOGY CO., LTD., Shanghai (CN)

( * ) Notice: Subject to any disclaimer, the term of this patent is extended or adjusted under 35 U.S.C. 154(b) by 250 days.

(21) Appl. No.: 16/690,922

(22) Filed: Nov. 21, 2019

(65) Prior Publication Data
US 2020/0166019 A1 May 28, 2020

(30) Foreign Application Priority Data

Nov. 23, 2018 (CN) .......................... 201811408152.X (51) Int. Cl.
| F03D 17/00 | (2016.01) |
| G06T 7/13 | (2017.01) |
| G06T 7/174 | (2017.01) |
| G06T 3/40 | (2006.01) |
| G06T 3/00 | (2006.01) |
| G06T 7/33 | (2017.01) |

(52) U.S. Cl.
CPC ............ *F03D 17/00* (2016.05); *G06T 3/0075* (2013.01); *G06T 3/4038* (2013.01); *G06T 7/13* (2017.01);
(Continued)

(58) Field of Classification Search
CPC ... G06T 3/0068; G06T 3/0075; G06T 3/0081; G06T 3/4038; G06T 7/30; G06T 7/32;
(Continued)

(56) References Cited

U.S. PATENT DOCUMENTS

| 2014/0168420 A1* | 6/2014 | Naderhirn | ............... F03D 80/50 348/128 |
| 2017/0287184 A1 | 10/2017 | Pettersson | |

(Continued)

FOREIGN PATENT DOCUMENTS

| CN | 108152295 | 6/2018 |
| CN | 108506170 | 9/2018 |

(Continued)

OTHER PUBLICATIONS

Ghosh, Debabrata, and Naima Kaabouch. "A survey on image mosaicing techniques." Journal of Visual Communication and Image Representation 34 (2016): 1-11. (Year: 2016).*

(Continued)

*Primary Examiner* — Geoffrey E Summers
(74) *Attorney, Agent, or Firm* — Myers Bigel, P.A.

(57) ABSTRACT

The present disclosure provides a method and device for stitching wind turbine blade images, and a storage medium. The method includes performing edge detection on a plurality of images of the blade of the wind turbine to determine a blade region for each of the plurality of images; and for each pair of images among the plurality of images of the blade of the wind turbine, which are captured successively, stitching a front end of a former one of the pair of images captured successively and a rear end of a latter one of the pair of images captured successively, wherein the front end is far away from a root of the blade of the wind turbine, and the rear end is close to the root of the blade of the wind turbine.

17 Claims, 8 Drawing Sheets

(52) U.S. Cl.
CPC .............. *G06T 7/174* (2017.01); *G06T 7/33* (2017.01); *F05B 2260/80* (2013.01); *G06T 2207/20221* (2013.01)

(58) Field of Classification Search
CPC .......... G06T 7/33; G06T 7/337; G06T 7/344; G06T 7/35; G06T 7/38; G06T 2207/20212; G06T 2207/20221; G06T 7/13; G06T 7/174; G06T 7/181; G06T 2207/30164; G06T 7/0004; G06T 7/0006; G06T 7/0008; G06T 7/001; F03D 17/00; F05B 2260/80; F05B 2270/8041
USPC .................................................. 382/284, 294
See application file for complete search history.

(56) References Cited

U.S. PATENT DOCUMENTS

2018/0003161 A1* 1/2018 Michini ................ B64C 39/024
2018/0018770 A1   1/2018 Hu et al.
2019/0304077 A1* 10/2019 Wang ........................ G06T 7/13

FOREIGN PATENT DOCUMENTS

| | | |
|---|---|---|
| CN | 108520521 | 9/2018 |
| CN | 108648140 | 10/2018 |

OTHER PUBLICATIONS

Doroshtnasir, Manoucher, et al. "On-site inspection of potential defects in wind turbine rotor blades with thermography." Wind energy 19.8 (2016): 1407-1422. (Year: 2016).*

LeBlanc, Bruce, et al. "Damage detection and full surface characterization of a wind turbine blade using three-dimensional digital image correlation." Structural Health Monitoring 12.5-6 (2013): 430-439. (Year: 2013).*

Poozesh, Peyman, et al. "Large-area photogrammetry based testing of wind turbine blades." Mechanical Systems and Signal Processing 86 (2017): 98-115. (Year: 2016).*

* cited by examiner

METHOD AND DEVICE FOR STITCHING WIND TURBINE BLADE IMAGES, AND STORAGE MEDIUM

CROSS-REFERENCE TO RELATED APPLICATIONS

This application claims priority to Chinese Patent Application No. 201811408152.X, filed with the National Intellectual Property Administration, PRC (CNIPA) on Nov. 23, 2018, which is incorporated herein by reference in its entirety.

FIELD

The present disclosure relates to the detection of a wind turbine blade and in particular, to a method and device for stitching wind turbine blade images, and a storage medium.

BACKGROUND

Wind turbines are power devices which convert wind energy into mechanical work which drives a rotor to rotate, and ultimately output alternating current. The wind turbines are generally composed of blades, power generators, yaw controllers, towers, speed-limiting safety mechanisms, energy storage apparatuses, and other members.

During the long-term operation of the wind turbines, surfaces of the blades will suffer various damages, such as damage to blade protection films, loss of blade paint, blade icing, blade cracks, blade oil stains and so on.

At present, the detection of the damage of the surfaces of the blades is usually carried out by manually climbing the wind turbine, which not only takes a lot of human resources, but also requires working at height when manually climbing the wind turbine for detection, which potentially puts the safety of an operator at risk.

Accordingly, the detection of the wind turbines performed by an unmanned aerial vehicle equipped with a camera can be a good substitute for manual detection. However, with the unmanned aerial vehicle equipped with the camera, a plurality of images ordered by time are acquired by the camera for each blade, and a defect is marked in each image. However, it is not possible to accurately localize the defect on the blade, then it is difficult to localize the defect during maintenance.

SUMMARY

The present disclosure provides a method and device for stitching wind turbine blade images, and a storage medium.

In an aspect, an image stitching method for a blade of a wind turbine is provided which includes:

performing edge detection on a plurality of images of the blade of the wind turbine to determine a blade region for each of the plurality of images; and for each pair of images among the plurality of images of the blade of the wind turbine, which are captured successively, stitching a front end of a former one of the pair of images captured successively and a rear end of a latter one of the pair of images captured successively, wherein the front end is far away from a root of the blade of the wind turbine, and the rear end is close to the root of the blade of the wind turbine.

In another aspect, an image stitching device is provided which includes:

a processor; and a memory storing program instructions that, when executed by the processor, cause the image stitching device to performing the following operations:

performing edge detection on a plurality of images of the blade of the wind turbine to determine a blade region for each of the plurality of images; and for each pair images among of the plurality of images of the blade of the wind turbine, which are captured successively, stitching a front end of a former one of the pair of images captured successively and a rear end of a latter one of the pair of images captured successively, wherein the front end is far away from a root of the blade of the wind turbine, and the rear end is close to the root of the blade of the wind turbine.

In still another aspect, a computer readable storage medium for storing a program that, when executed by a processor of a computing device, cause the computing device to performing the following operations:

performing edge detection on a plurality of images of the blade of the wind turbine to determine a blade region for each of the plurality of images; and for each pair of images among the plurality of images of the blade of the wind turbine, which are captured successively, stitching a front end of a former one of the pair of images captured successively and a rear end of a latter one of the pair of images captured successively, wherein the front end is far away from a root of the blade of the wind turbine, and the rear end is close to the root of the blade of the wind turbine.

BRIEF DESCRIPTION OF THE DRAWINGS

Other features, objects, and advantages of the present disclosure will become more apparent upon reading the following detailed description of non-limiting embodiments made with reference to the accompanying drawings, in which.

In the figures.

1 refers to the former wind turbine blade image; and

2 refers to the latter wind turbine blade image.

DETAILED DESCRIPTION OF EMBODIMENTS

The present disclosure will be described in detail below in conjunction with the specific embodiments. The following embodiments will help those skilled in the art to further understand the present disclosure, but are not intended to limit the present disclosure in any way. It should be noted that a person of ordinary skill in the art could also make several alterations and improvements without departing from the spirit of the present disclosure and these shall all fall within the scope of protection of the present disclosure.

Figure 1:
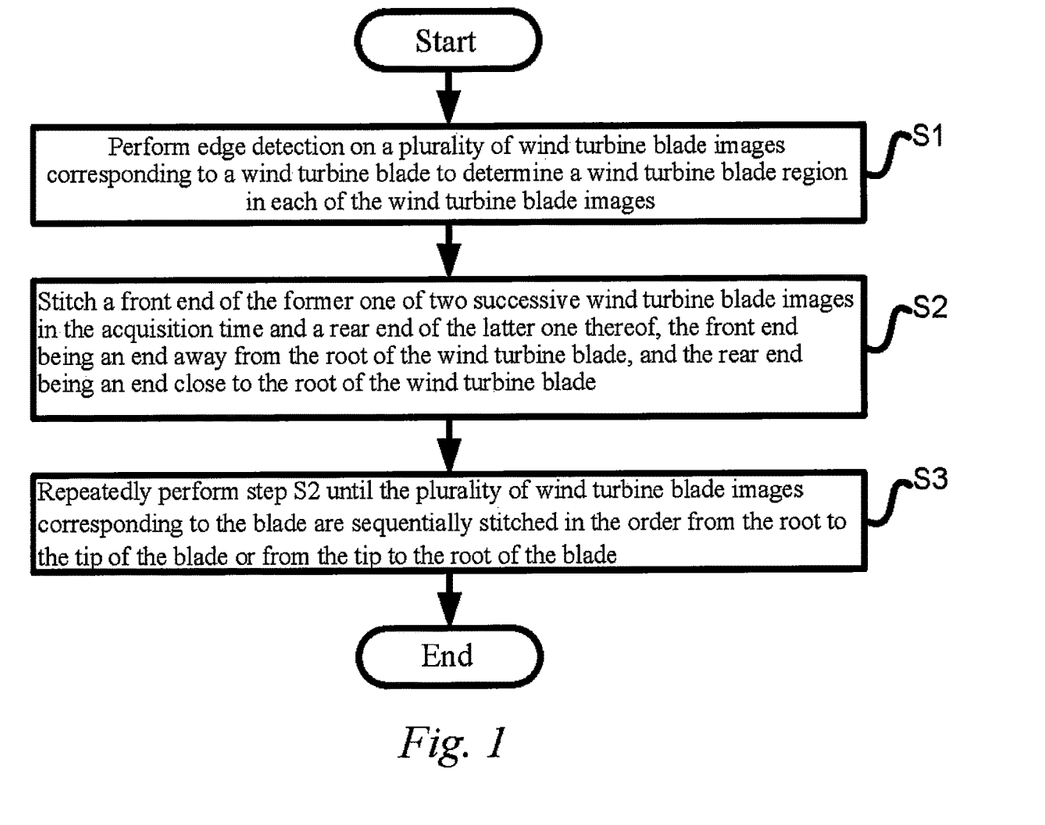
FIG. 1 is a flow chart illustrating steps of a method for stitching wind turbine blade images according to the present disclosure.

FIG. 1 is a flow chart illustrating steps of a method for stitching wind turbine blade images according to the present disclosure. As shown in FIG. 1, a method for stitching images of a wind turbine blade is provided according to the present disclosure. The wind turbine comprises a wind tower and an impeller disposed at a top end of the wind tower, and the impeller comprises a hub and three wind turbine blades uniformly distributed circumferentially along the hub. The method comprises the following steps:

step S1: performing edge detection on a plurality of wind turbine blade images corresponding to a wind turbine blade to determine a wind turbine blade region in each of the wind turbine blade images;

step S2: stitching a front end of the former one of two successive wind turbine blade images in the acquisition time and a rear end of the latter one thereof, the front end being an end far away from the root of the wind turbine blade, and the rear end being an end close to the root of the wind turbine blade; and step S3: repeatedly performing step S2 until the plurality of wind turbine blade images corresponding to the blade are sequentially stitched in the order from the root to the tip of the blade or from the tip to the root of the blade.

The root of the blade of the wind turbine is an end of the blade of the wind turbine which is close to the hub, and the tip of the blade of the wind turbine is another end of the blade of the wind turbine which is far away from the hub.

In embodiments, when an unmanned aerial vehicle equipped with a camera flies from the root to the tip of the wind turbine blade or from the tip to the root of the wind turbine blade, the camera acquires a plurality of wind turbine blade images corresponding to different segments of the wind turbine blade. For example, the stitching is sequentially performed in the order from the root to the tip of the blade. Before stitching, first, the plurality of wind turbine blade images corresponding to each wind turbine blade are arranged in the positive or reverse order of time to form a root-to-tip picture line.

In embodiments, according to the present disclosure, it can sequentially stitch a plurality of wind turbine blade images corresponding to a wind turbine blade in the order of acquisition time to form a complete wind turbine blade image, thereby facilitating accurate localization of defects on the wind turbine blade, and facilitating localizing the defects during maintenance of the wind turbine blade.

Figure 2:
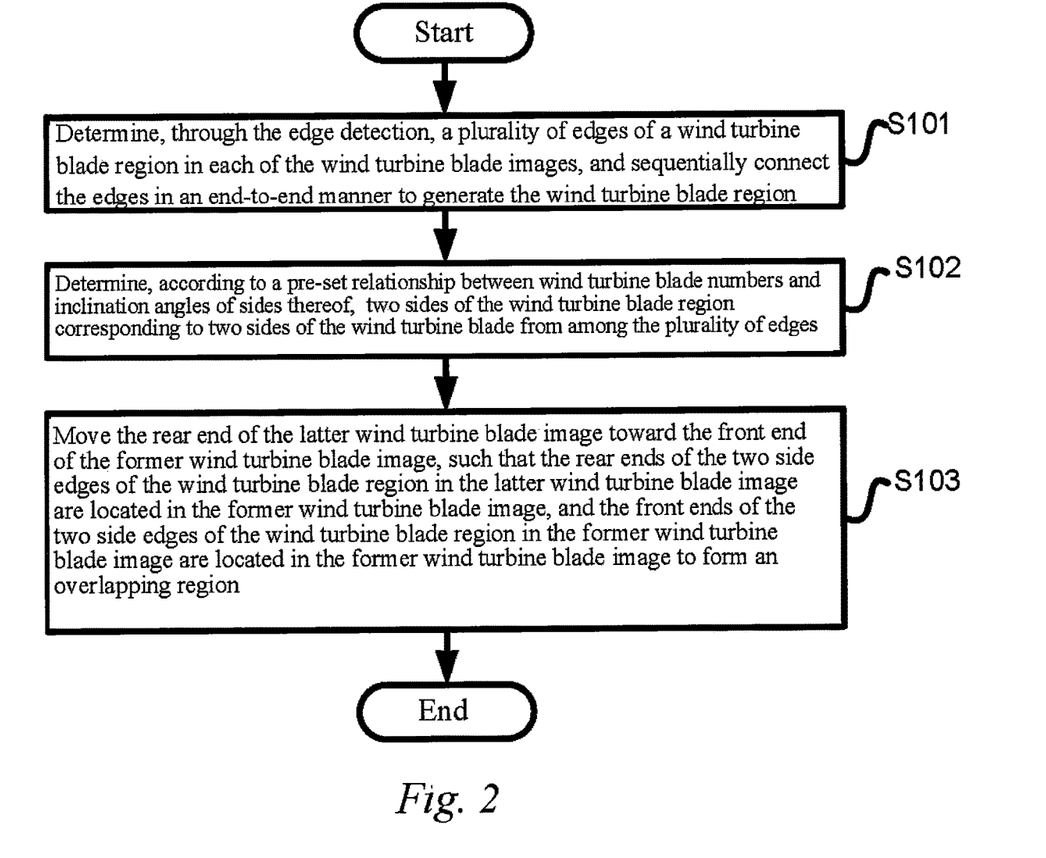
FIG. 2 is a flow chart illustrating steps for forming a preliminary overlapping region of a latter wind turbine blade image and a former wind turbine blade image according to the present disclosure.

FIG. 2 is a flow chart illustrating steps for forming a preliminary overlapping region of the latter wind turbine blade image and the former wind turbine blade image according to the present disclosure. As shown in FIG. 2, step S1 comprises the steps as follows:

step S101: determining, through the edge detection, a plurality of edges of a wind turbine blade region in each of the wind turbine blade images, and sequentially connecting the edges in an end-to-end manner to generate the wind turbine blade region;

step S102: determining, according to a pre-set relationship between wind turbine blade numbers and inclination angles of sides thereof, two sides of the wind turbine blade region corresponding to two sides of the wind turbine blade from among the plurality of edges; and step S103: moving the rear end of the latter wind turbine blade image toward the front end of the former wind turbine blade image, such that the rear ends of the two sides of the wind turbine blade region in the latter wind turbine blade image are located in the former wind turbine blade image, and the front ends of the two sides of the wind turbine blade region in the former wind turbine blade image are located in the former wind turbine blade image to form a preliminary overlapping region.

Step S102 is specifically as follows:

when an XOY coordinate system is established with the center of the wind turbine blade image as the origin, the pre-set relationship between the wind turbine blade numbers and the inclination angles of the sides is specifically as follows:

extracting, in the plurality of wind turbine blade images corresponding to the wind turbine blade numbered A, an edge at an angle of $[150°-\alpha, 150°+\alpha]$ relative to the positive direction of the X-axis as a side of the wind turbine blade region;

extracting, in the plurality of wind turbine blade images corresponding to the wind turbine blade numbered B, an edge at an angle of $[90°-\alpha, 90°+\alpha]$ relative to the positive direction of the X-axis as a side of the wind turbine blade region; and extracting, in the plurality of wind turbine blade images corresponding to the wind turbine blade numbered C, an edge at an angle of $[30°-\alpha, 30°+\alpha]$ relative to the positive direction of the X-axis as a side of the wind turbine blade region;

where the value of a is $[5°, 10°]$. X axis of the XOY coordinate system corresponds to a horizontal direction and Y axis of the XOY coordinate system correspond to a vertical direction. When the camera of the unmanned aerial vehicle captures images, it may labels the horizontal direction and the vertical direction in the images.

The above rules are set according to the position where the wind turbine is stopped. In embodiments, when the wind turbine is stopped, the wind turbine blade numbered A and the wind turbine blade numbered C are exactly located on both sides of the wind tower at an angle of about 60° to the wind tower. The wind turbine blade numbered B is on the same line as the wind tower and is at an angle of about 180° to the wind tower.

Figure 3:
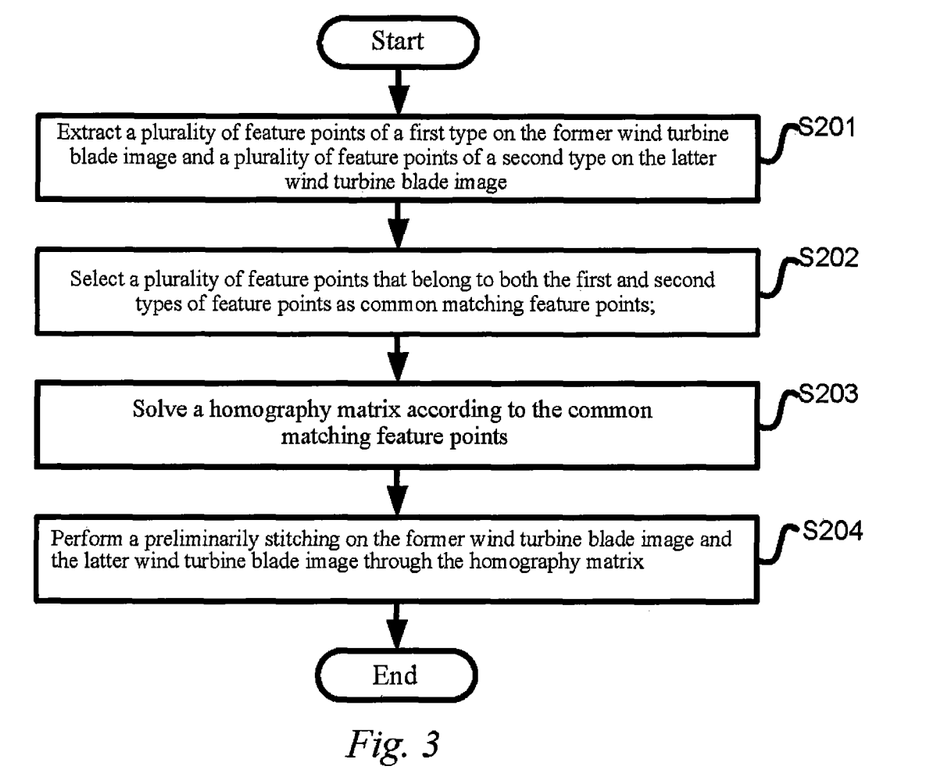
FIG. 3 is a flow chart illustrating steps of a first preliminary stitching method for the latter wind turbine blade image and the former wind turbine blade image according to the present disclosure.

FIG. 3 is a flow chart illustrating steps of a first preliminary stitching method for the latter wind turbine blade image and the former wind turbine blade image according to the present disclosure. As shown in FIG. 3, step S2 comprises the steps as follows:

step S201: extracting a plurality of feature points of a first type on the former wind turbine blade image and a plurality of feature points of a second type on the latter wind turbine blade image;

step S202: selecting a plurality of feature points that belong to both the first and second types of feature points as common matching feature points;

step S203: solving a homography matrix according to the common matching feature points; and step S204: performing preliminarily stitching on the former wind turbine blade image and the latter wind turbine blade image through the homography matrix.

Figure 6:
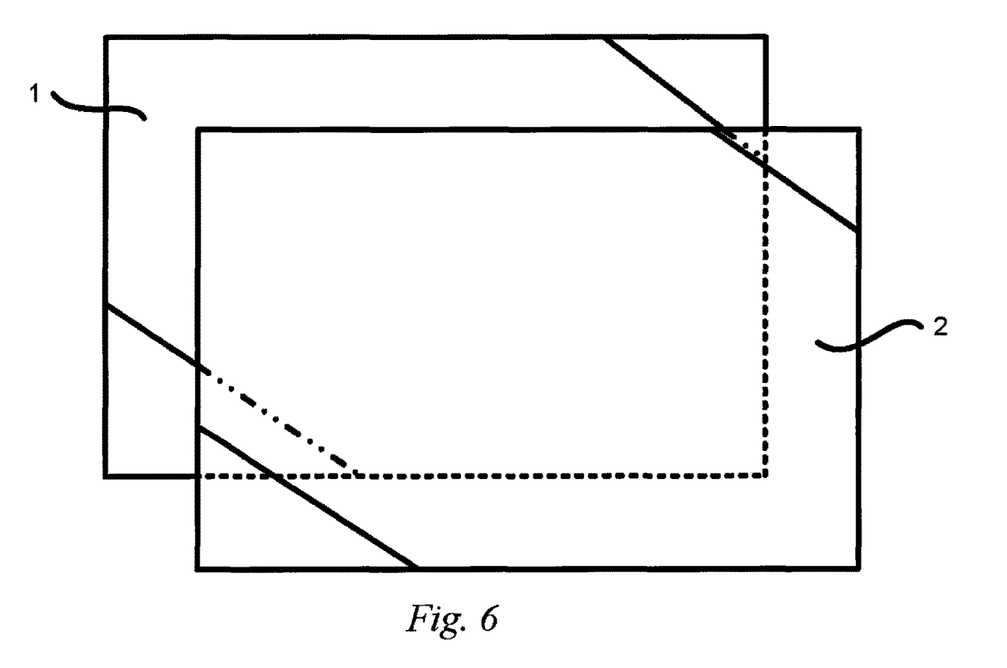
FIG. 6 is a schematic diagram illustrating a first preliminary stitching of the latter wind turbine blade image and the former wind turbine blade image according to the present disclosure.

FIG. 6 is a schematic diagram illustrating a first preliminary stitching of the latter wind turbine blade image and the former wind turbine blade image according to the present disclosure. As shown in FIG. 6, relation of the two wind turbine blade images after completing the first preliminary stitching is shown.

In embodiments, the first type of feature points and the second type of feature points include any one or more of the following defects:
a defect region on the wind turbine blade image;
a stain region on the wind turbine blade image;
a dust region on the wind turbine blade image; and
a crack region on the wind turbine blade image.

Figure 4:
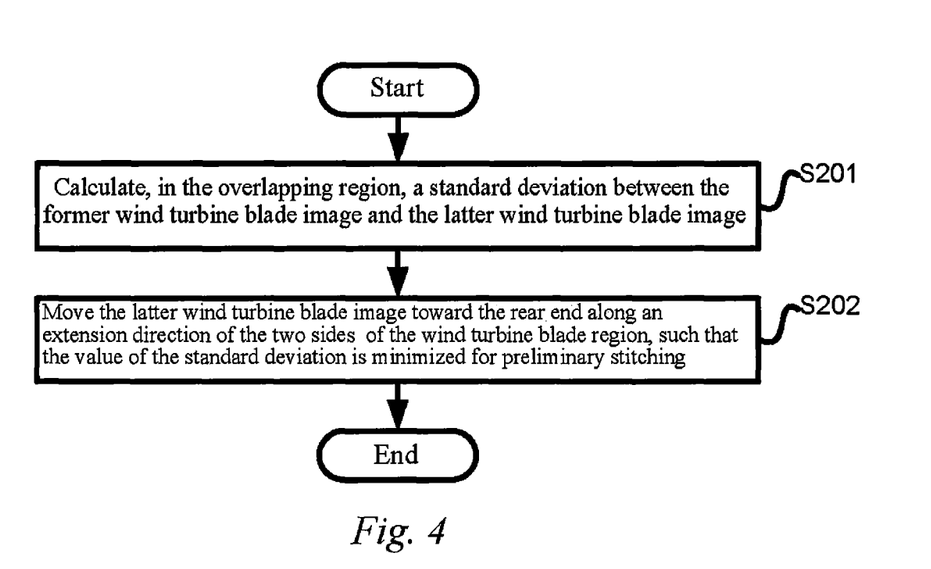
FIG. 4 is a flow chart illustrating steps of a second preliminary stitching method for the latter wind turbine blade image and the former wind turbine blade image according to the present disclosure.

FIG. 4 is a flow chart illustrating steps of a second preliminary stitching method for the latter wind turbine blade image and the former wind turbine blade image according to the present disclosure. As shown in FIG. 4, step S2 comprises the steps as follows:

step S201: calculating, in the preliminary overlapping region, a standard deviation between the former wind turbine blade image and the latter wind turbine blade image; and step S202: moving the latter wind turbine blade image toward the rear end along an extension direction of the two sides of the wind turbine blade region, such that the value of the standard deviation is minimized for preliminary stitching.

In embodiments, after the first preliminary stitching method fails, the second preliminary stitching method can be automatically triggered to perform the preliminary stitching again. For example, if the common matching feature point cannot be found in the first preliminary stitching method or the number of the common matching feature points is less than a pre-set number, such as 5, it is determined that the first stitching method fails.

After the second preliminary stitching method fails, the steps of forming the preliminary overlapping region of the latter wind turbine blade image and the former wind turbine blade image as shown in FIG. 2 are performed, and then side alignment step is performed. If the standard deviation between the former wind turbine blade image and the latter wind turbine blade image in the first calculation is less than a pre-set threshold, such as 10000, it is determined that the second stitching method fails. In the present disclosure, the standard deviation of pixels is calculated after converting the latter wind turbine blade image and the former wind turbine blade image into grayscale images.

Figure 5:
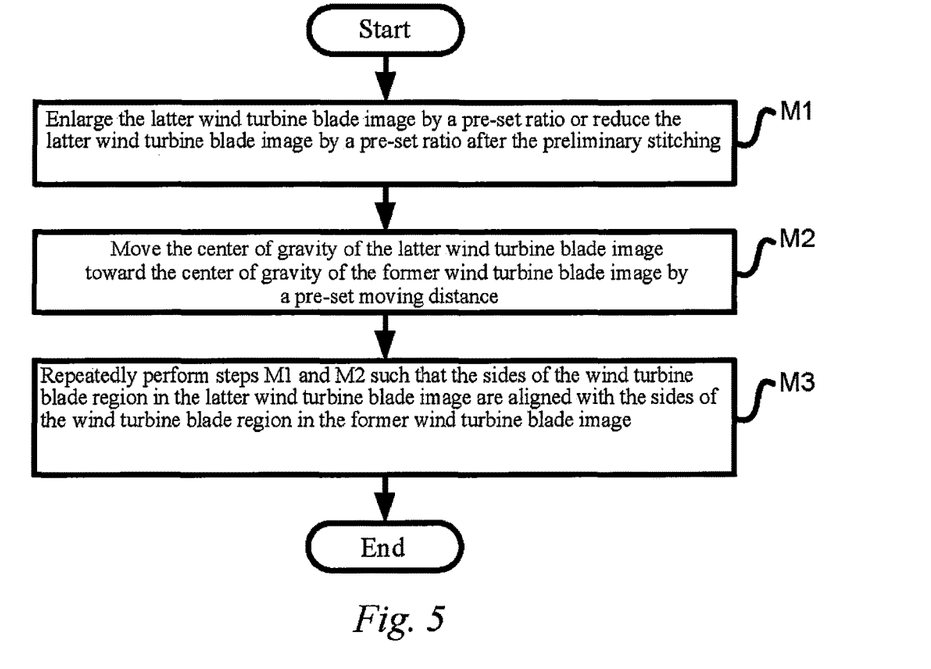
FIG. 5 is a flow chart illustrating a side alignment step for the latter wind turbine blade image and the former wind turbine blade image according to the present disclosure.

FIG. 5 is a flow chart illustrating a side alignment step for the latter wind turbine blade image and the former wind turbine blade image according to the present disclosure. The side alignment step comprises the steps as follows:

step M1: enlarging the latter wind turbine blade image by a pre-set ratio when $A_1$ is greater than $A_2$, and reducing the latter wind turbine blade image by a pre-set ratio when $A_1$ is smaller than $A_2$ after the preliminary stitching, where $A_1$ is the overlapping area of the wind turbine blade region of the former wind turbine blade image and the latter wind turbine blade image, and $A_2$ is the overlapping area of the wind turbine blade region of the latter wind turbine blade image and the former wind turbine blade image;

step M2: moving the center of gravity of the latter wind turbine blade image toward the center of gravity of the former wind turbine blade image by a pre-set moving distance; and step M3: repeatedly performing steps M1 and M2 such that the sides of the wind turbine blade region in the latter wind turbine blade image are aligned with the sides of the wind turbine blade region in the former wind turbine blade image.

In embodiments, in step M3, the sides of the wind turbine blade region in the latter wind turbine blade image being aligned with the sides of the wind turbine blade region in the former wind turbine blade image is specifically such that the value of a loss function M is minimized, the loss function M being as follows:

$$M = \left(\frac{A_3}{A_1} - 1\right)^2 + \left(\frac{A_3}{A_2} - 1\right)^2 + \left(\frac{A_3}{A_1} - \frac{A_3}{A_2}\right)^2$$

where $A_3$ is the overlapping area of the wind turbine blade region of the latter wind turbine blade image and the wind turbine blade region of the former wind turbine blade.

In embodiments, the pre-set ratio may be set to 1.02, 1.03, 1.04, or 1.05. The pre-set moving distance may be set to be one tenth to one-twentieth of the center of gravity of the latter wind turbine blade image to the center of gravity of the former wind turbine blade image.

Figure 7:
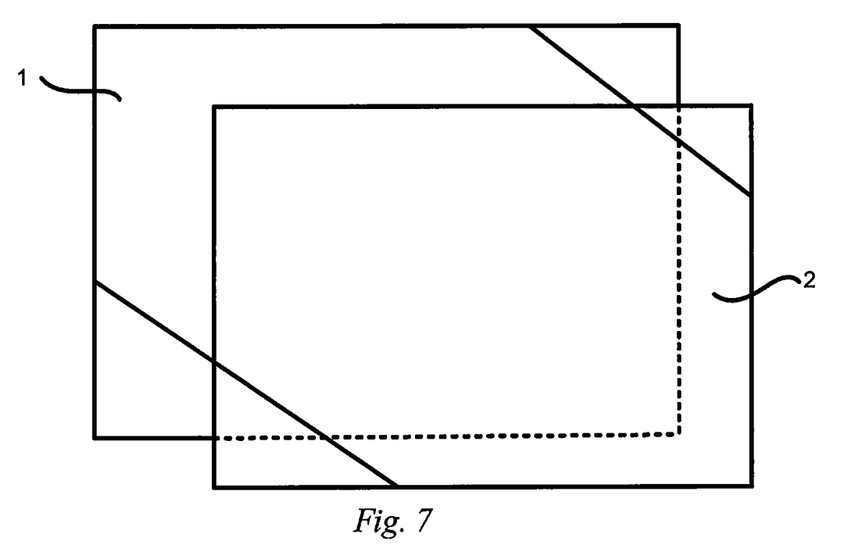
FIG. 7 is a schematic diagram illustrating the side alignment after the first preliminary stitching of the latter wind turbine blade image and the former wind turbine blade image according to the present disclosure.

FIG. 6 is a schematic diagram illustrating a first preliminary stitching of the latter wind turbine blade image and the former wind turbine blade image according to the present disclosure. FIG. 7 is a schematic diagram illustrating the side alignment after the first stitching method is completed.

Figure 8:
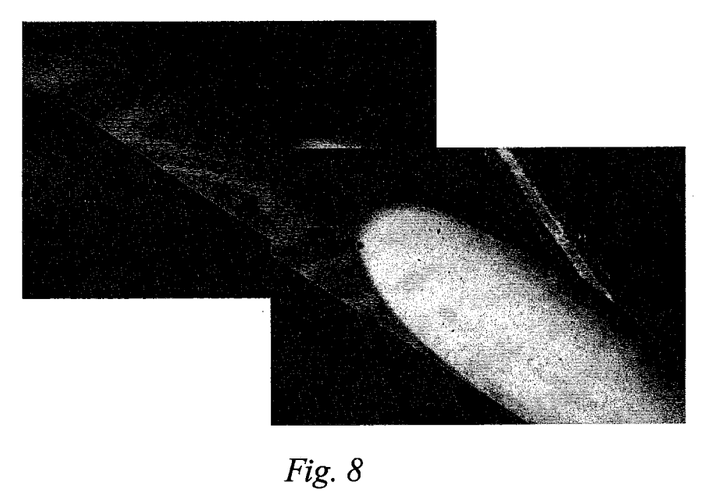
FIG. 8 is a schematic diagram illustrating a preliminary overlapping region formed by the latter wind turbine blade image and the former wind turbine blade image according to the present disclosure.
Figure 9:
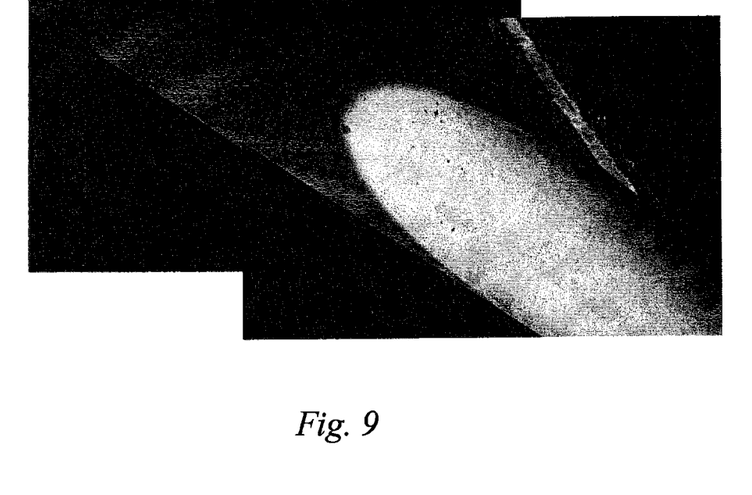
FIG. 9 is a schematic diagram illustrating a second preliminary stitching of the latter wind turbine blade image and the former wind turbine blade image according to the present disclosure.
Figure 10:
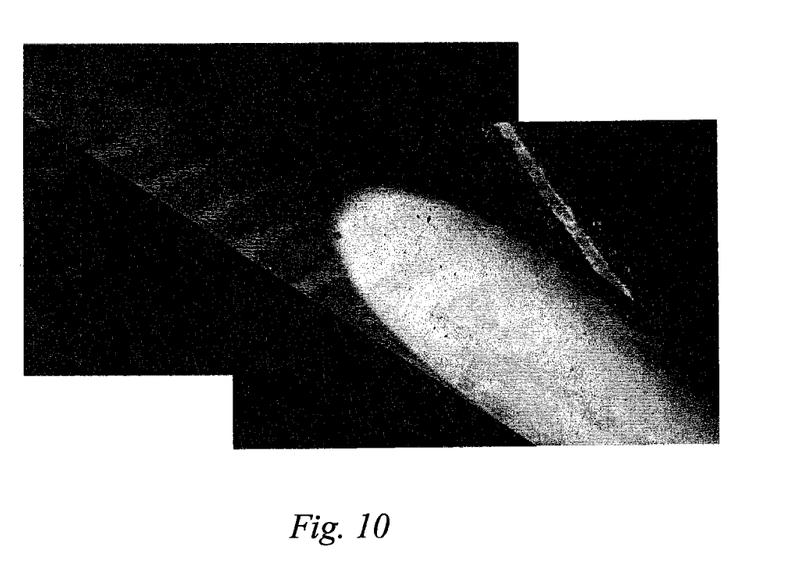
FIG. 10 is a schematic diagram illustrating the side alignment after the second preliminary stitching of the latter wind turbine blade image and the former wind turbine blade image according to the present disclosure.

FIG. 8 is a schematic diagram illustrating a preliminary overlapping region formed by the latter wind turbine blade image and the former wind turbine blade image according to the present disclosure; FIG. 9 is a schematic diagram illustrating a second preliminary stitching of the latter wind turbine blade image and the former wind turbine blade image according to the present disclosure; and FIG. 10 is a schematic diagram illustrating the side alignment after the second preliminary stitching of the latter wind turbine blade image and the former wind turbine blade image according to the present disclosure. The second stitching method of the present disclosure and the side alignment after the stitching are shown in FIGS. 8, 9 and 10.

Figure 11:
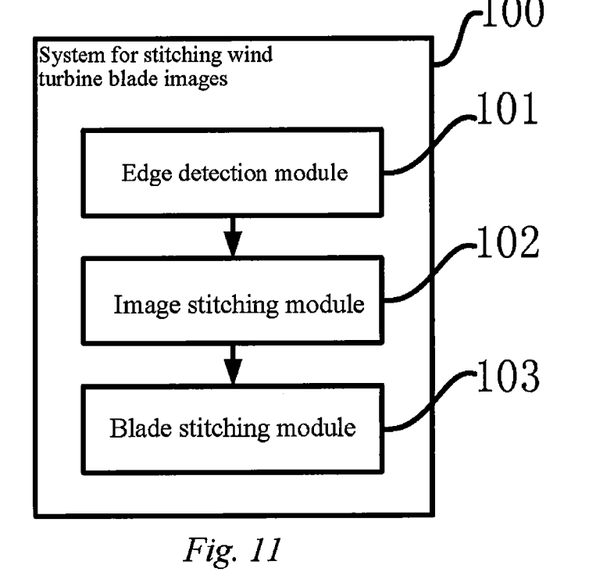
FIG. 11 is a schematic diagram illustrating modules of a system for stitching wind turbine blade images according to the present disclosure.

FIG. 11 is a schematic diagram illustrating modules of a system 100 for stitching wind turbine blade images according to the present disclosure. As shown in FIG. 11, a system for stitching wind turbine blade images, for use in implementing the method for stitching wind turbine blade images, includes:

an edge detection module 101 for performing edge detection on a plurality of wind turbine blade images corresponding to a wind turbine blade to determine a wind turbine blade region in each of the wind turbine blade images;

an image stitching module 102 for stitching a front end of the former one of two successive wind turbine blade images in the acquisition time and a rear end of the latter one thereof, the front end being an end far away from the root of the wind turbine blade, and the rear end being an end close to the root of the wind turbine blade; and a blade stitching module 103 for repeatedly invoking the image stitching module until the plurality of wind turbine blade images corresponding to the wind turbine blade are sequentially stitched in the order from the root to the tip of the blade or from the tip to the root of the blade.

A device for stitching wind turbine blade images is further provided in an embodiment of the present disclosure, which comprises: a processor and a memory storing executable instructions for the processor. The processor is configured to perform the steps of the method for stitching wind turbine blade images through execution of the executable instructions.

As described above, in embodiments of the present disclosure, it can sequentially stitch a plurality of wind turbine blade images corresponding to a wind turbine blade in the order of acquisition time to form a complete wind turbine blade image, thereby facilitating accurate localization of defects on the wind turbine blade, and facilitating localizing the defects during maintenance of the wind turbine blade.

A person skilled in the art can understand that each aspect of the present disclosure may be implemented as a system, a method or a program product. Accordingly, each aspect of the present disclosure may be specifically implemented in the form of: a pure hardware implementation, a pure software implementation (including firmware, microcodes, etc.), or an implementation incorporating hardware and software aspects, which may be collectively referred to herein as a "circuit", "module", or "platform".

Figure 12:
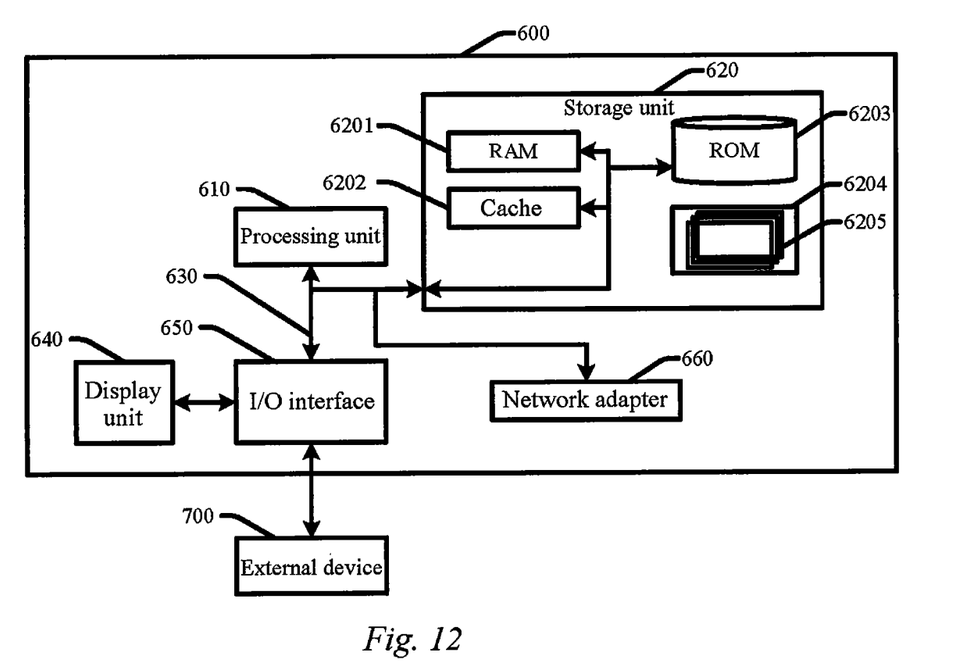
FIG. 12 is a schematic structural diagram of a device for stitching wind turbine blade images according to the present disclosure.

FIG. 12 is a schematic structural diagram illustrating a device for stitching wind turbine blade images according to the present disclosure. An electronic device 600 according to such an embodiment of the present disclosure is described below with reference to FIG. 12. The electronic device 600 shown in FIG. 12 is merely an example and should not impose any limitation on the function and usage range of the embodiments of the present disclosure.

As shown in FIG. 12, the electronic device 600 is embodied in the form of a general purpose computing device. The components of the electronic device 600 may include, but are not limited to: at least one processing unit 610, at least one storage unit 620, a bus 630 for connecting different platform components (including the storage unit 620 and the processing unit 610), and a display unit 640.

The storage unit stores program codes, which can be executed by the processing unit 610, such that the processing unit 610 performs the steps according to the various exemplary embodiments of the present disclosure described in the "method for stitching wind turbine blade images" section of the description. For example, the processing unit 610 can perform the steps as shown in FIG. 1.

The storage unit 620 may comprise a readable medium in the form of a volatile storage unit, such as a random access memory (RAM) 6201 and/or a cache storage unit 6202, and may also further comprise a read only memory (ROM) 6203.

The storage unit 620 may also comprise a program/utility tool 6204 having a set of (at least one) program modules 6205, such program modules 6205 including but not limited to: an operating system, one or more application programs, and other program modules and program data, wherein each of or a certain combination of these examples may comprise the implementation of a network environment.

The bus 630 may be representative of one or more of several types of bus structures, including a storage unit bus or a storage unit controller, a peripheral bus, a graphics acceleration port, a processing unit, or a local area bus that uses any of a variety of bus structures.

The electronic device 600 may also communicate with one or more external devices 700 (such as, for example, a keyboard, a pointing device, a Bluetooth device), and may also communicate with one or more devices that enable a user to interact with the electronic device 600, and/or communicate with any device (such as, for example, a router, a modem) that enables the electronic device 600 to communicate with one or more other computing devices. This communication can be conducted via an input/output (I/O) interface 650. Also, the electronic device 600 can also communicate with one or more networks (for example, a local area network (LAN), a wide area network (WAN), and/or a public network, such as the Internet) via a network adapter 660. The network adapter 660 may communicate with other modules of the electronic device 600 via the bus 630. It should be understood that, although not shown in FIG. 12, other hardware and/or software modules may be utilized in conjunction with the electronic device 600, including but not limited to: microcodes, a device driver, a redundant processing unit, an external disk drive array, an RAID system, a tape drive, a data backup storage platform, etc.

A computer readable storage medium for storing a program is further provided in an embodiment of the present disclosure, wherein the program is executed to implement the steps of the method for stitching wind turbine blade images. In some possible embodiments, various aspects of the present disclosure may also be implemented in the form of a program product comprising program codes for causing, when the program product is running on a terminal device, the terminal device to perform the steps according to various exemplary embodiments of the present disclosure described in the "method for stitching wind turbine blade images" section of the description.

As indicated above, when the program of the computer readable storage medium of this embodiment is executed, the present disclosure can sequentially splice a plurality of wind turbine blade images corresponding to a wind turbine blade in the order of acquisition time to form a complete wind turbine blade image, thereby facilitating accurate localization of defects on the wind turbine blade, and facilitating localizing the defects during maintenance of the wind turbine blade.

Figure 13:
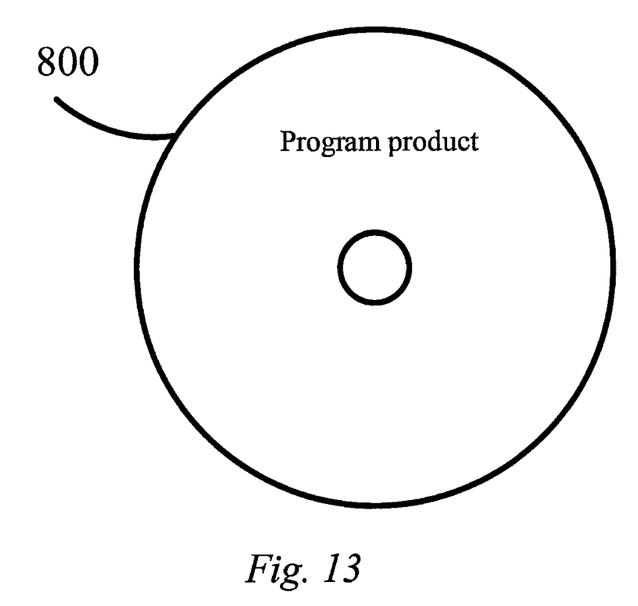
FIG. 13 is a schematic structural diagram of a computer readable storage medium according to the present disclosure.

FIG. 13 is a schematic structural diagram of a computer readable storage medium according to the present disclosure. Referring to FIG. 13, it describes a program product 800 for implementing the above method according to the embodiments of the present disclosure, which may employ a portable compact disk read only memory (CD-ROM) and comprise program codes, and may be running on a terminal device, for example a personal computer. However, the program product of the present disclosure is not limited thereto, and in this document, the readable storage medium may be any tangible medium containing or storing a program that can be used by or used in connection with an instruction execution system, apparatus or device.

The program product may employ any combination of one or more readable media. The readable medium may be a readable signal medium or a readable storage medium. The readable storage medium may be, for example, but not limited to, an electronic, magnetic, optical, electromagnetic, infrared, or semiconductor system, apparatus, or device, or any combination thereof. More specific examples of the readable storage media (a non-exhaustive list) comprise: an electrical connection having one or more wires, a portable disk, a hard disk, a random access memory (RAM), a read only memory (ROM), an erasable programmable read only memory (EPROM or flash), fiber optics, a portable compact disk read only memory (CD-ROM), an optical storage device, a magnetic storage device, or any suitable combination thereof.

The computer readable storage medium may comprise a data signal that is propagated in a baseband or as a part of a carrier, in which readable program codes are carried. Such propagated data signal may take a variety of forms, including, but not limited to, an electromagnetic signal, an optical signal, or any suitable combination thereof. The readable storage medium may also be any readable medium, other than a readable storage medium, that can send, propagate, or transmit a program for use by or use in connection with an instruction execution system, apparatus, or device. The program code contained on the readable storage medium can be transmitted using any suitable medium, including but not limited to wireless, wired, optical cable, RF, etc., or any suitable combination thereof.

The program codes for performing the operations of the present disclosure may be written in any combination of one or more programming languages, wherein the programming languages comprise an object oriented programming language, such as Java, and C++, and further comprise conventional procedural programming languages, such as "C" language or similar programming languages. The program codes may be completely executed on a user computing device, partially executed on a user device, executed as an independent software package, executed partially on a user computing device and partially on a remote computing device, or completely executed on a remote computing device or a server. In the case of a remote computing device, the remote computing device can be connected to a user computing device via any kind of network, including a local area network (LAN) or a wide area network (WAN), or can be connected to an external computing device (for example, connected via the Internet with the aid of an Internet service provider).

In this embodiment, the present disclosure can sequentially splice a plurality of wind turbine blade images corresponding to a wind turbine blade in the order of acquisition time to form a complete wind turbine blade image, thereby facilitating accurate localization of defects on the wind turbine blade, and facilitating localizing the defects during maintenance of the wind turbine blade. In the present disclosure, after the former wind turbine blade image and the latter wind turbine blade image are subjected to the preliminary stitching, the positions of the former wind turbine blade image and the latter wind turbine blade image are adjusted by means of the pre-set loss function M to realize the alignment of the sides of the wind turbine blade regions in the former and latter images, thereby improving the image stitching effect.

Various aspects of the present disclosure may be appreciated from the following enumerated example embodiments (EEEs):

EEE1. A method for stitching wind turbine blade images, the wind turbine including a wind tower and an impeller disposed at a top end of the wind tower, the impeller including a hub and three wind turbine blades uniformly distributed circumferentially along the hub, where the method includes the steps as follows:

step S1: performing edge detection on a plurality of wind turbine blade images corresponding to a wind turbine blade to determine a wind turbine blade region in each of the wind turbine blade images;

step S2: stitching a front end of the former one of two successive wind turbine blade images in the acquisition time and a rear end of the latter one thereof, the front end being an end far away from the root of the wind turbine blade, and the rear end being an end close to the root of the wind turbine blade; and step S3: repeatedly performing step S2 until the plurality of wind turbine blade images corresponding to the blade are sequentially stitched in the order from the root to the tip of the blade or from the tip to the root of the blade.

EEE2. The method for stitching wind turbine blade images according to EEE1, where step S1 includes the steps as follows:

step S101: determining, through the edge detection, a plurality of edges of a wind turbine blade region in each of the wind turbine blade images, and sequentially connecting the edges in an end-to-end manner to generate the wind turbine blade region;

step S102: determining, according to a pre-set relationship between wind turbine blade numbers and inclination angles of sides thereof, two sides of the wind turbine blade region corresponding to two sides of the wind turbine blade, from among the plurality of edges; and step S103: moving the rear end of the latter wind turbine blade image toward the front end of the former wind turbine blade image, such that the rear ends of the two sides of the wind turbine blade region in the latter wind turbine blade image are located in the former wind turbine blade image, and the front ends of the two sides of the wind turbine blade region in the former wind turbine blade image are located in the former wind turbine blade image to form a preliminary overlapping region.

EEE3. The method for stitching wind turbine blade images according to EEE2, wherein step S102 is specifically as follows:

when an XOY coordinate system is established with the center of the wind turbine blade image as the origin, the pre-set relationship between the wind turbine blade numbers and the inclination angles of the sides is specifically as follows:

extracting, in the plurality of wind turbine blade images corresponding to the wind turbine blade numbered A, an edge at an angle of $[120°-\alpha, 120°+\alpha]$ relative to the positive direction of the X-axis as a side of the wind turbine blade region;

extracting, in the plurality of wind turbine blade images corresponding to the wind turbine blade numbered B, an edge at an angle of $[90°-\alpha, 90°+\alpha]$ to the positive direction of the X-axis as a side of the wind turbine blade region; and extracting, in the plurality of wind turbine blade images corresponding to the wind turbine blade numbered C, an edge at an angle of $[60°-\alpha, 60°+\alpha]$ to the positive direction of the X-axis as a side of the wind turbine blade region;

where the value of $\alpha$ is $[5°, 10°]$.

EEE4. The method for stitching wind turbine blade images according to EEE1, where step S2 includes the steps as follows:

step S201: extracting a plurality of feature points of a first type on the former wind turbine blade image and a plurality of feature points of a second type on the latter wind turbine blade image;

step S202: selecting a plurality of feature points that belong to both the first and second types of feature points as common matching feature points;

step S203: solving a homography matrix according to the common matching feature points; and step S204: performing preliminarily stitching on the former wind turbine blade image and the latter wind turbine blade image through the homography matrix.

EEE5. The method for stitching wind turbine blade images according to EEE2, where step S2 includes the steps as follows:

step S201: calculating, in the preliminary overlapping region, a standard deviation between the former wind turbine blade image and the latter wind turbine blade image; and step S202: moving the latter wind turbine blade image toward the rear end along an extension direction of the two sides of the wind turbine blade region, such that the value of the standard deviation is minimized for preliminary stitching.

EEE6. The method for stitching wind turbine blade images according to EEE4 or EEE5, further including a side alignment step, which includes the steps as follows:

step M1: enlarging the latter wind turbine blade image by a pre-set ratio when $A_1$ is greater than $A_2$, and reducing the latter wind turbine blade image by a pre-set ratio when $A_1$ is smaller than $A_2$ after the preliminary stitching, where $A_1$ is the overlapping area of the wind turbine blade region of the former wind turbine blade image and the latter wind turbine blade image, and $A_2$ is the overlapping area of the wind turbine blade region of the latter wind turbine blade image and the former wind turbine blade image;

step M2: moving the center of gravity of the latter wind turbine blade image toward the center of gravity of the former wind turbine blade image by a pre-set moving distance; and step M3: repeatedly performing steps M1 and M2 such that the sides of the wind turbine blade region in the latter wind turbine blade image are aligned with the sides of the wind turbine blade region in the former wind turbine blade image.

EEE7. The method for stitching wind turbine blade images according to EEE6, where in step M3, the sides of the wind turbine blade region in the latter wind turbine blade image being aligned with the sides of the wind turbine blade region in the former wind turbine blade image is specifically such that the value of a loss function M is minimized, the loss function M being as follows:

$$M = \left(\frac{A_3}{A_1} - 1\right)^2 + \left(\frac{A_3}{A_2} - 1\right)^2 + \left(\frac{A_3}{A_1} - \frac{A_3}{A_2}\right)^2$$

where $A_3$ is the overlapping area of the wind turbine blade region of the latter wind turbine blade image and the wind turbine blade region of the former wind turbine blade.

EEE8. A system for stitching wind turbine blade images, for implementing the method for stitching wind turbine blade images according to any one of EEE1 to EEE7, including:

an edge detection module for performing edge detection on a plurality of wind turbine blade images corresponding to a wind turbine blade to determine a wind turbine blade region in each of the wind turbine blade images;

an image stitching module for stitching a front end of the former one of two successive wind turbine blade images in the acquisition time and a rear end of the latter one thereof, the front end being an end far away from the root of the wind turbine blade, and the rear end being an end close to the root of the wind turbine blade; and a blade stitching module for repeatedly invoking the image stitching module until the plurality of wind turbine blade images corresponding to the wind turbine blade are sequentially stitched in the order from the root to the tip of the blade or from the tip to the root of the blade.

EEE9. A device for stitching wind turbine blade images, including:

a processor; and a memory storing executable instructions for the processor, where the processor is configured to perform the steps of the method for stitching wind turbine blade images of any one of claims 1 to 7 through execution of the executable instructions.

EEE10. A computer readable storage medium for storing a program, that when executed, implements the steps of the method for stitching wind turbine blade images of any one of EEE1 to EEE7.

Compared with the prior art, the present disclosure has the following beneficial effects.

The present disclosure can sequentially splice a plurality of wind turbine blade images corresponding to a wind turbine blade in the order of acquisition time to form a complete wind turbine blade image, thereby facilitating accurate localization of defects on the wind turbine blade, and facilitating localizing the defects during maintenance of the wind turbine blade.

In the present disclosure, after the former wind turbine blade image and the latter wind turbine blade image are subjected to the preliminary stitching, the positions of the former wind turbine blade image and the latter wind turbine blade image are adjusted by means of the pre-set loss function M to realize the alignment of the sides of the wind turbine blade regions in the former and latter images, thereby improving the image stitching effect.

The specific embodiments of the present disclosure are described above. It is to be understood that the present disclosure is not limited to the specific embodiments described above, and various modifications or changes may be made by those skilled in the art within the scope of the claims, without having any influence on the substantive content of the present disclosure.

The invention claimed is:

1. An image stitching method for a blade of a wind turbine, comprising:

performing edge detection on a plurality of images of the blade of the wind turbine to determine a blade region for each of the plurality of images; and for each pair of images among the plurality of images of the blade of the wind turbine, which are captured successively, stitching a front end of a former one of the pair of images captured successively and a rear end of a latter one of the pair of images captured successively, wherein the front end is far away from a root of the blade of the wind turbine, and the rear end is close to the root of the blade of the wind turbine, wherein performing edge detection on the plurality of images of the blade of the wind turbine to determine the blade region for each of the plurality of images comprises:

for each of the plurality of images of the blade of the wind turbine:
determining, through the edge detection, a plurality of edges in the image;
connecting the plurality of edges to generate the blade region; and
determining, according to an inclination angle of two sides of the blade of the wind turbine, two edges from among the plurality of edges as two sides of the blade region, which correspond to the two sides of the blade of the wind turbine; and moving the rear end of the latter one of the pair of images of the blade of the wind turbine toward the front end of the former one of the pair of images of the blade of the wind turbine, such that a portion of the two sides of the blade region in the latter one of the pair of images of the blade of the wind turbine is located in the former one of the pair of images of the blade of the wind turbine, and a portion of the two sides of the blade region in the former one of the pair of images of the blade of the wind turbine is located in the latter one of the pair of images of the blade of the wind turbine to form a preliminary overlapping region.

2. The image stitching method according to claim 1, further comprising:
for each of the plurality of images of the blade of the wind turbine, establishing an XOY coordinate system, wherein a center of the image of the blade of the wind turbine is an origin of the XOY coordinate system, X axis of the XOY coordinate system corresponds to a horizontal direction and Y axis of the XOY coordinate system corresponds to a vertical direction,
wherein determining, according to the inclination angle of two sides of the blade of the wind turbine, two edges from among the plurality of edges as two sides of the blade region, which correspond to the two sides of the blade of the wind turbine, comprises:
determining a number for the blade of the wind turbine;
in response to the number being equal to a first value, determining, from among the plurality of edges, edges with an angle from 150° −α to 150° +α relative to a positive direction of the X-axis as the sides of the blade region;
in response to the number being equal to a second value, determining, from among the plurality of edges, edges with an angle from 90° −α to 90° +α relative to the positive direction of the X-axis as the sides of the blade region;
in response to the number being equal to a third value, determining, from among the plurality of edges, edges with an angle from 30° −α to 30° +α relative to the positive direction of the X-axis as the sides of the blade region;
wherein α has a value from 5° to 10°.

3. The image stitching method according to claim 2, further comprising:
labelling the horizontal direction and the vertical direction in the plurality of images of the blade of the wind turbine, when capturing the plurality of images of the blade of the wind turbine.

4. The image stitching method according to claim 1, wherein stitching the front end of the former one of the pair of images captured successively and the rear end of the latter one of the pair of images captured successively, comprises:
extracting a first set of feature points from the former one of the pair of images of the blade of the wind turbine and a second set of feature points from the latter one of the pair of images of the blade of the wind turbine;
determining a plurality of feature points that belong to both the first and second sets as common matching feature points;
solving a homography matrix according to the common matching feature points; and
performing preliminarily stitching on the former one of the pair of images of the blade of the wind turbine and the latter one of the pair of images of the blade of the wind turbine through the homography matrix.

5. The image stitching method according to claim 4, further comprising aligning the sides of the blade region of the former one of the pair of images of the blade of the wind turbine and the sides of the blade region of the latter one of the pair of images of the blade of the wind turbine;
wherein aligning the sides of the blade region of the former one of the pair of images of the blade of the wind turbine and the sides of the blade region of the latter one of the pair of images of the blade of the wind turbine comprises:
after the preliminary stitching, enlarging the latter one of the pair of images of the blade of the wind turbine by a pre-set ratio when $A_1$ is greater than $A_2$, and reducing the latter one of the pair of images of the blade of the wind turbine by a further pre-set ratio when $A_1$ is smaller than $A_2$, wherein $A_1$ is an overlapping area of the blade region of the former one of the pair of images of the blade of the wind turbine and the latter one of the pair of images of the blade of the wind turbine, and $A_2$ is another overlapping area of the blade region of the latter one of the pair of images of the blade of the wind turbine and the former one of the pair of images of the blade of the wind turbine; and
moving a center of gravity of the latter one of the pair of images of the blade of the wind turbine toward a center of gravity of the former one of the pair of images of the blade of the wind turbine by a pre-set moving distance.

6. The image stitching method according to claim 5, wherein aligning the sides of the blade region of the former one of the pair of images of the blade of the wind turbine and the sides of the blade region of the latter one of the pair of images of the blade of the wind turbine comprises:
minimizing a value of a loss function M, the loss function M being as follows:

$$M = \left(\frac{A_3}{A_1} - 1\right)^2 + \left(\frac{A_3}{A_2} - 1\right)^2 + \left(\frac{A_3}{A_1} - \frac{A_3}{A_2}\right)^2$$

wherein $A_3$ is an overlapping area of the blade region of the latter one of the pair of images of the blade of the wind turbine and the blade region of the former one of the pair of images of the blade of the wind turbine.

7. The image stitching method according to claim 1, wherein stitching the front end of a former one of the pair of images captured successively and the rear end of the latter one of the pair of images captured successively, comprises:
calculating a standard deviation between the former one of the pair of images of the blade of the wind turbine and the latter one of the pair of images of the blade of the wind turbine, for the preliminary overlapping region; and moving at least one of the former one of the pair of images of the blade of the wind turbine and the latter one of the pair of images of the blade of the wind turbine, such that a value of the standard deviation is minimized for preliminary stitching.

8. The image stitching method according to claim 7, further comprising aligning the sides of the blade region of the former one of the pair of images of the blade of the wind turbine and the sides of the blade region of the latter one of the pair of images of the blade of the wind turbine;

wherein aligning the sides of the blade region of the former one of the pair of images of the blade of the wind turbine and the sides of the blade region of the latter one of the pair of images of the blade of the wind turbine comprises:

after the preliminary stitching, enlarging the latter one of the pair of images of the blade of the wind turbine by a pre-set ratio when $A_1$ is greater than $A_2$, and reducing the latter one of the pair of images of the blade of the wind turbine by a further pre-set ratio when $A_1$ is smaller than $A_2$, wherein $A_1$ is an overlapping area of the blade region of the former one of the pair of images of the blade of the wind turbine and the latter one of the pair of images of the blade of the wind turbine, and $A_2$ is another overlapping area of the blade region of the latter one of the pair of images of the blade of the wind turbine and the former one of the pair of images of the blade of the wind turbine; and moving a center of gravity of the latter one of the pair of images of the blade of the wind turbine toward a center of gravity of the former one of the pair of images of the blade of the wind turbine by a pre-set moving distance.

9. The image stitching method according to claim 8, wherein aligning the sides of the blade region of the former one of the pair of images of the blade of the wind turbine and the sides of the blade region of the latter one of the pair of images of the blade of the wind turbine comprises:

minimizing a value of a loss function M, the loss function M being as follows:

$$M = \left(\frac{A_3}{A_1} - 1\right)^2 + \left(\frac{A_3}{A_2} - 1\right)^2 + \left(\frac{A_3}{A_1} - \frac{A_3}{A_2}\right)^2$$

wherein $A_3$ is an overlapping area of the blade region of the latter one of the pair of images of the blade of the wind turbine and the blade region of the former one of the pair of images of the blade of the wind turbine.

10. The image stitching method according to claim 7, wherein moving at least one of the former one of the pair of images of the blade of the wind turbine and the latter one of the pair of images of the blade of the wind turbine comprises:

moving the latter one of the pair of images of the blade of the wind turbine toward the rear end along an extension direction of two sides of the blade region.

11. The image stitching method according to claim 1, wherein the wind turbine comprising a wind tower and an impeller disposed at a top end of the wind tower, the impeller comprising a hub and three blades uniformly distributed circumferentially along the hub.

12. The image stitching method according to claim 11, wherein the root of the blade of the wind turbine is an end of the blade of the wind turbine which is close to the hub, and a tip of the blade of the wind turbine is another end of the blade of the wind turbine which is far away from the hub.

13. The image stitching method according to claim 1, further comprising:

stitching the plurality of images of the blade of the wind turbine in an order from the root of the blade to a tip of the blade or from the tip of the blade to the root of the blade.

14. An image stitching device, comprising:

a processor; and a memory comprising program instructions stored therein that, when executed by the processor, cause the processor to perform operations comprising:

performing edge detection on a plurality of images of the blade of the wind turbine to determine a blade region for each of the plurality of images; and for each pair images among of the plurality of images of the blade of the wind turbine, which are captured successively, stitching a front end of a former one of the pair of images captured successively and a rear end of a latter one of the pair of images captured successively, wherein the front end is far away from a root of the blade of the wind turbine, and the rear end is close to the root of the blade of the wind turbine, wherein performing edge detection on the plurality of images of the blade of the wind turbine to determine the blade region for each of the plurality of images comprises:

for each of the plurality of images of the blade of the wind turbine:

determining, through the edge detection, a plurality of edges in the image;

connecting the plurality of edges to generate the blade region; and determining, according to an inclination angle of two sides of the blade of the wind turbine, two edges from among the plurality of edges as two sides of the blade region, which correspond to the two sides of the blade of the wind turbine; and moving the rear end of the latter one of the pair of images of the blade of the wind turbine toward the front end of the former one of the pair of images of the blade of the wind turbine, such that a portion of the two sides of the blade region in the latter one of the pair of images of the blade of the wind turbine is located in the former one of the pair of images of the blade of the wind turbine, and a portion of the two sides of the blade region in the former one of the pair of images of the blade of the wind turbine is located in the latter one of the pair of images of the blade of the wind turbine to form a preliminary overlapping region.

15. The image stitching device according to claim 14, wherein the operations further comprise:

for each of the plurality of images of the blade of the wind turbine, establishing an XOY coordinate system, wherein a center of the image of the blade of the wind turbine is an origin of the XOY coordinate system, X axis of the XOY coordinate system corresponds to a horizontal direction and Y axis of the XOY coordinate system corresponds to a vertical direction;

determining a number for the blade of the wind turbine;

in response to the number being equal to a first value, determining, from among the plurality of edges, edges with an angle from 150° −α to 150° +α relative to a positive direction of the X-axis as the sides of the blade region;

in response to the number being equal to a second value, determining, from among the plurality of edges, edges with an angle from 90° −α to 90° +α relative to the positive direction of the X-axis as the sides of the blade region;

in response to the number being equal to a third value, determining, from among the plurality of edges, edges with an angle from 30° −α to 30° +α relative to the positive direction of the X-axis as the sides of the blade region;

wherein α has a value from 5° to 10°.

16. The image stitching device according to claim 14, wherein stitching the front end of the former one of the pair of images captured successively and the rear end of the latter one of the pair of images captured successively, comprises:

extracting a first set of feature points from the former one of the pair of images of the blade of the wind turbine and a second set of feature points from the latter one of the pair of images of the blade of the wind turbine;

determining a plurality of feature points that belong to both the first and second sets as common matching feature points;

solving a homography matrix according to the common matching feature points; and performing preliminarily stitching on the former one of the pair of images of the blade of the wind turbine and the latter one of the pair of images of the blade of the wind turbine through the homography matrix.

17. A non-transitory computer readable storage medium comprising computer readable program code embodied in the medium that is executable by a processor of a computing device to cause the computing device to perform operations comprising:

performing edge detection on a plurality of images of the blade of the wind turbine to determine a blade region for each of the plurality of images; and for each pair of images among the plurality of images of the blade of the wind turbine, which are captured successively, stitching a front end of a former one of the pair of images captured successively and a rear end of a latter one of the pair of images captured successively, wherein the front end is far away from a root of the blade of the wind turbine, and the rear end is close to the root of the blade of the wind turbine, wherein performing edge detection on the plurality of images of the blade of the wind turbine to determine the blade region for each of the plurality of images comprises:

for each of the plurality of images of the blade of the wind turbine:

determining, through the edge detection, a plurality of edges in the image;

connecting the plurality of edges to generate the blade region; and determining, according to an inclination angle of two sides of the blade of the wind turbine, two edges from among the plurality of edges as two sides of the blade region, which correspond to the two sides of the blade of the wind turbine; and moving the rear end of the latter one of the pair of images of the blade of the wind turbine toward the front end of the former one of the pair of images of the blade of the wind turbine, such that a portion of the two sides of the blade region in the latter one of the pair of images of the blade of the wind turbine is located in the former one of the pair of images of the blade of the wind turbine, and a portion of the two sides of the blade region in the former one of the pair of images of the blade of the wind turbine is located in the latter one of the pair of images of the blade of the wind turbine to form a preliminary overlapping region.

* * * * *